United States Patent
Robinson et al.

(10) Patent No.: US 6,798,579 B2
(45) Date of Patent: Sep. 28, 2004

(54) REAL IMAGING SYSTEM WITH REDUCED GHOST IMAGING

(75) Inventors: Douglas L. Robinson, Ithaca, NY (US); Kenneth S. Westort, Ithaca, NY (US)

(73) Assignee: Optical Products Development Corp., Elmira, NY (US)

( * ) Notice: Subject to any disclaimer, the term of this patent is extended or adjusted under 35 U.S.C. 154(b) by 0 days.

(21) Appl. No.: 10/350,762

(22) Filed: Jan. 24, 2003

(65) Prior Publication Data

US 2003/0147145 A1 Aug. 7, 2003

Related U.S. Application Data

(63) Continuation-in-part of application No. 09/933,331, filed on Aug. 20, 2001, now Pat. No. 6,612,201, which is a continuation-in-part of application No. 09/557,859, filed on Apr. 26, 2000, now abandoned.
(60) Provisional application No. 60/121,320, filed on Apr. 27, 1999.

(51) Int. Cl.[7] .............................................. G02B 27/14
(52) U.S. Cl. ........................ 359/631; 359/630; 359/649
(58) Field of Search .......................... 359/12, 483, 618, 359/629–31, 633, 649–51, 850, 864, 857–858; 353/20

(56) References Cited

U.S. PATENT DOCUMENTS

| | | | |
|---|---|---|---|
| 3,647,284 A | 3/1972 | Elings et al. ................ 359/858 |
| RE27,356 E | 5/1972 | LaRussa ..................... 359/494 |
| 3,682,532 A | 8/1972 | Myles ........................ 359/494 |
| 4,093,347 A | 6/1978 | LaRussa ..................... 359/630 |
| 4,112,462 A | 9/1978 | Mecklenborg .............. 348/121 |
| 4,653,875 A | 3/1987 | Hines ......................... 359/487 |
| 4,721,380 A | 1/1988 | Gryglas ....................... 353/66 |
| 4,802,750 A | 2/1989 | Welck ........................ 359/365 |
| 4,810,092 A | 3/1989 | Auth ........................... 356/451 |
| 4,850,152 A | 7/1989 | Heynacher et al. ............ 451/5 |
| 4,989,953 A * | 2/1991 | Kirschner .................... 359/888 |
| 5,237,157 A | 8/1993 | Kaplan ........................ 235/375 |
| 5,257,130 A | 10/1993 | Monroe ....................... 359/478 |
| 5,268,775 A | 12/1993 | Zeidler ........................... 349/5 |
| 5,291,897 A | 3/1994 | Gastrin et al. .............. 600/529 |
| 5,305,124 A | 4/1994 | Chern et al. .................. 359/13 |

(List continued on next page.)

FOREIGN PATENT DOCUMENTS

| | | | |
|---|---|---|---|
| JP | 07 043634 | 2/1995 | ........... G02B/27/02 |
| JP | 08 152579 | 6/1996 | ........... G02B/27/28 |
| WO | WO 00/65844 | 11/2000 | ............ H04N/9/30 |

OTHER PUBLICATIONS

U.S. patent application Ser. No. 10/388,062, Westort et al., filed Mar. 13, 2003.
U.S. patent application Ser. No. 10/126,167, Robinson et al., filed Apr. 19, 2002.
U.S. patent application Ser. No. 10/147,632, Turner et al., filed May 16, 2002.
Jenkins, Francis A and White, Harvey E. "Fundamentals of Optics". McGraw–Hill Publishing Company Ltd. 1937.

Primary Examiner—Jordan M. Schwartz
Assistant Examiner—Jessica Stultz
(74) Attorney, Agent, or Firm—Brown & Michaels, PC

(57) ABSTRACT

A real image display system includes a primary image source for projecting a primary image from the start of a primary light path to an end of the primary light path at which the primary image is viewable, two reflectors positioned in the primary light path between the primary image source and the projected real image, a circular polarizer for circularly polarizing a light beam positioned in the primary light path between the mirror and real image, whereby outside light entering the system is substantially blocked before exiting the system, thereby substantially eliminating ghost image formation caused by outside light sources.

20 Claims, 6 Drawing Sheets

U.S. PATENT DOCUMENTS

| | | | |
|---|---|---|---|
| 5,311,357 A | 5/1994 | Summer et al. | 359/479 |
| 5,369,450 A | 11/1994 | Haseltime et al. | 348/745 |
| 5,380,999 A | 1/1995 | Prakash et al. | 250/216 |
| 5,486,840 A | 1/1996 | Borrego et al. | 345/7 |
| 5,539,578 A | 7/1996 | Togino et al. | 359/630 |
| 5,576,887 A | 11/1996 | Ferrin et al. | 359/631 |
| 5,585,946 A | 12/1996 | Chern | 349/5 |
| 5,596,451 A | 1/1997 | Handschy et al. | 359/633 |
| 5,606,458 A | 2/1997 | Fergason | 359/630 |
| 5,621,572 A | 4/1997 | Fergason | 359/630 |
| 5,687,025 A | 11/1997 | Nanba | 359/633 |
| 5,708,529 A | 1/1998 | Togino et al. | 359/630 |
| 5,777,794 A * | 7/1998 | Nakaoka | 359/632 |
| 5,777,795 A | 7/1998 | Colucci | 359/633 |
| 5,782,547 A | 7/1998 | Machtig et al. | 353/28 |
| 5,831,712 A | 11/1998 | Tabata et al. | 351/158 |
| 5,886,818 A | 3/1999 | Summer et al. | 359/478 |
| 5,903,396 A | 5/1999 | Rallison | 359/630 |
| 5,961,192 A | 10/1999 | Bernart et al. | 312/223.3 |
| 6,163,408 A | 12/2000 | LaRussa | 359/630 |
| 6,262,841 B1 * | 7/2001 | Dike | 359/483 |
| 6,262,849 B1 | 7/2001 | Potin et al. | 359/631 |
| 6,315,416 B1 | 11/2001 | Domingues-Montes et al. | 359/99 |
| 6,318,868 B1 | 11/2001 | LaRussa | 359/857 |
| RE37,667 E | 4/2002 | Togino et al. | 359/630 |
| 6,364,490 B1 | 4/2002 | Krause | 353/77 |
| 6,390,626 B2 | 5/2002 | Knox | 353/20 |
| 6,421,182 B1 | 7/2002 | Holden | 359/629 |
| 6,445,407 B1 | 9/2002 | Wright | 348/51 |
| 6,497,484 B1 | 12/2002 | Hoerner et al. | 353/10 |
| 6,522,483 B2 | 2/2003 | Kreuzer | 359/727 |
| 6,598,976 B2 | 7/2003 | Westort et al. | 353/28 |
| 6,607,275 B1 | 8/2003 | Cimini et al. | 353/28 |
| 6,612,701 B2 | 9/2003 | Westort et al. | 353/10 |
| 6,650,470 B1 | 11/2003 | Turner et al. | 359/443 |
| 2002/0027718 A1 | 3/2002 | Kreuzer | 359/631 |
| 2002/0044287 A1 * | 4/2002 | Otaki | 356/521 |
| 2002/0184104 A1 | 12/2002 | Littman | 705/26 |
| 2003/0035086 A1 | 2/2003 | Robinson et al. | 353/10 |
| 2003/0197839 A1 | 10/2003 | Robinson et al. | 353/98 |

* cited by examiner

REAL IMAGING SYSTEM WITH REDUCED GHOST IMAGING

REFERENCE TO RELATED APPLICATIONS

This is a continuation-in-part patent application of application Ser. No. 09/933,331, filed Aug. 20, 2001, now U.S. Pat. No. 6,612,701, entitled "IMAGE ENHANCEMENT IN A REAL IMAGE PROJECTION SYSTEM, USING ON-AXIS REFLECTORS, AT LEAST ONE OF WHICH IS ASPHERIC IN SHAPE", and application Ser. No. 09/557,859, filed Apr. 26, 2000, now abandoned entitled "REAL OR VIRTUAL IMAGING SYSTEM WITH REDUCED GHOST IMAGING", which claims an invention which was disclosed in Provisional Application Number 60/131,320, filed April 27, 1999, entitled "NO GHOST FILTER". The benefit under 35 USC §119(e) of the United States provisional application is hereby claimed, and the three aforementioned applications are hereby incorporated herein by reference in their entirety.

BACKGROUND OF THE INVENTION

1. Field of the Invention

The invention pertains to the field of real image display systems. More particularly, the invention pertains to a real image display system incorporating two curved mirrors, at least one of which has an aspheric surface of revolution, or a tilted spherical mirror whose optical path does not reflect off of a beamsplitter surface.

2. Description of Related Art

It is desirable in modem imaging display systems to provide images having good contrast that appear sharp and undistorted to the viewer. One of the major problems in presenting a clear image is that real and infinity imaging systems generally employ curved mirrors and exhibit problems with secondary ghosting, that is, forming an additional image of the projected light source image at the point of observation. This occurs when outside light enters an imaging system and is projected as an additional ghost image near the focal point at which the primary image is projected and viewed.

The preferred solution to this problem is the use of a circular polarizer. The problem with this, however, is that conventional real image projection devices incorporate a beamsplitter tilted at 45 degrees to divert the converging imaging beam to form a real image outside of the device in viewer space. The circular polarizer will not block the ghosts when positioned at the window aperture of the system, because circularly polarized light will be distorted to elliptically polarized light when transmitting through a tilted beamsplitter, and will not transform back to circular when passing back through the beamsplitter after reflecting off of the curved reflector. The elliptically polarized light, therefore will not revert to linear after passing through the quarter wave plate on the second pass, and therefore will not be blocked. The compromise has been to position the quarter wave element of the circular polarizer between the curved mirror and the beamsplitter to avoid elliptical distortion, so the light is circularly polarized after passing through the beamsplitter. The difficulty with this approach is that the size of the quarter wave plate must be nearly equal in size to the curved mirror, and large quarter wave plates are not readily accessible or affordable. The size of the material required becomes smaller as its position nears the real image projection focal point, because the beampath is converging to form the real image. This elliptical distortion is the reason that prior art systems specify that the quarter wave element of the circular polarizer must be located between the beamsplitter and the curved mirror.

SUMMARY OF THE INVENTION

Briefly stated, a real image display system includes a primary image source for projecting a primary image from the start of a primary light path to an end of the primary light path at which the primary image is viewable, two reflectors positioned in the primary light path between the primary image source and the projected real image, a circular polarizer for circularly polarizing a light beam positioned in the primary light path between the mirror and real image, whereby outside light entering the system is substantially blocked before exiting the system, thereby substantially eliminating ghost image formation caused by outside light sources.

The circular polarizing plate is extremely effective, particularly in systems that do not include a beamsplitter positioned at a 45 degree angle to the optical axis, as in prior art systems, such as those described in U.S. Pat. Nos. 5,585,946 and 5,305,124. The systems disclosed in these patents place the circular polarizer elements between the mirror and beamsplitter, because of the effect of elliptical polarization caused by circularly polarized light passing through a beamsplitter at an angle other than normal to the surface. The circular polarizer placed at the window aperture of a conventional real image projection device containing a 45 degree positioned beamsplitter will not effectively block the ghost imaging.

DETAILED DESCRIPTION OF THE INVENTION

Figure 1:
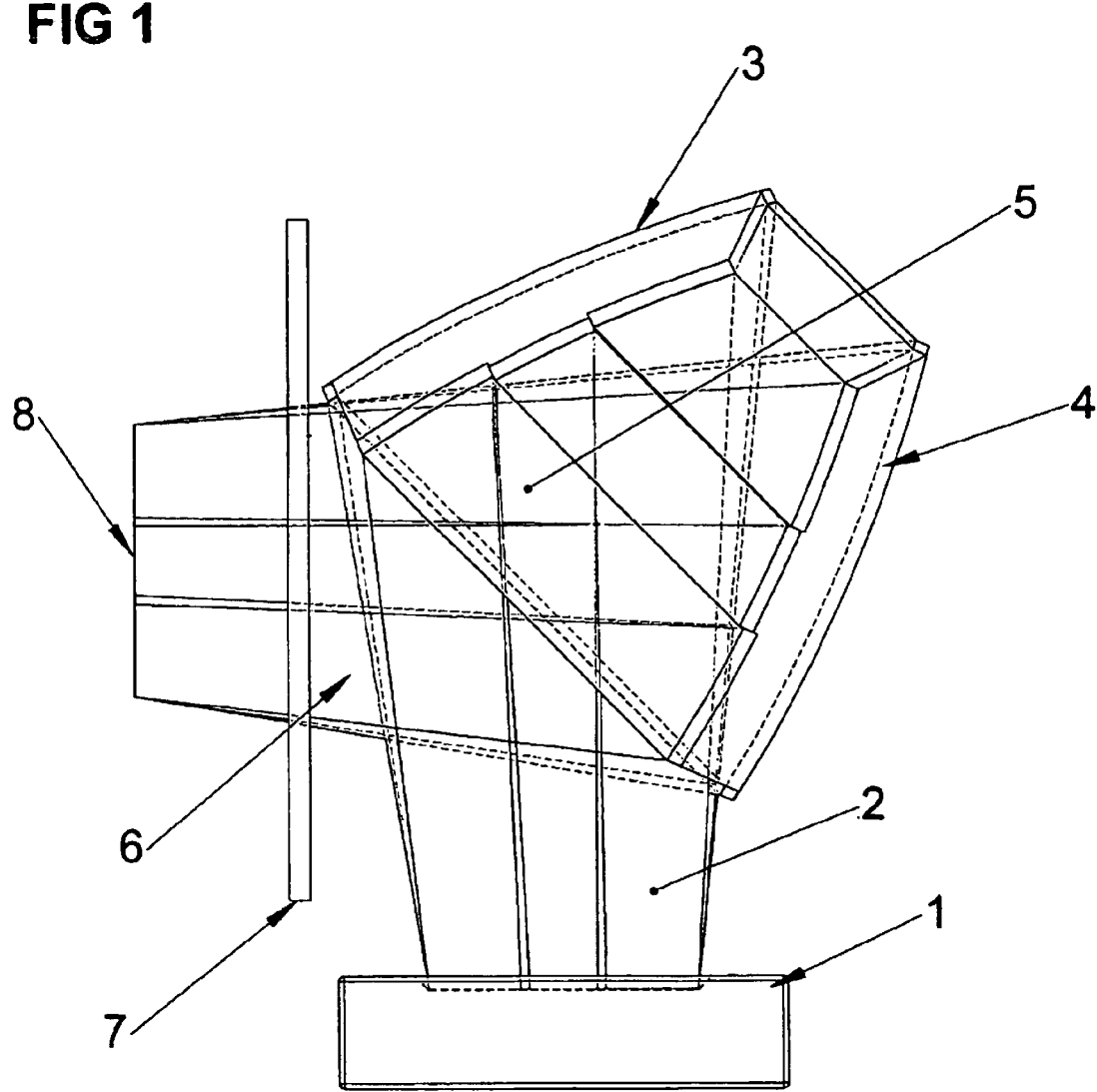
FIG. 1 shows a real imaging system that includes at least one aspheric curved reflector and a circular polarizer or neutral density window for ghost reduction.

Referring to FIG. 1, an on-axis dual aspheric imaging system, for example, as described in copending application Ser. No. 09/933,321, filed Aug. 2, 2001, entitled "IMAGE ENHANCEMENT IN A REAL IMAGE PROJECTION SYSTEM, USING ON-AXIS REFLECTORS, AT LEAST ONE OF WHICH IS ASPHERIC IN SHAPE", the complete disclosure of which is hereby incorporated herein by reference, incorporates an image input source (1), two curved reflectors (3, 4, one of which has an aspheric revolution of curvature), a circular polarizing plate (7) and a real image projection (8). Light (2) from the image source or monitor (1) strikes the upper curved reflector (3), and reflects in a collimated beam (5) striking the lower curved reflector (4), and then reflects in a converging beam (6), passing through the circular polarizer (7) and forming a real image (8) in free space in front of the display. The circular polarizer (7) is made up of a quarter wave plate attached to a linear polarizing film. The linear polarizing film is on the surface facing the real image and the opposite side from the curved reflectors.

Figure 2:
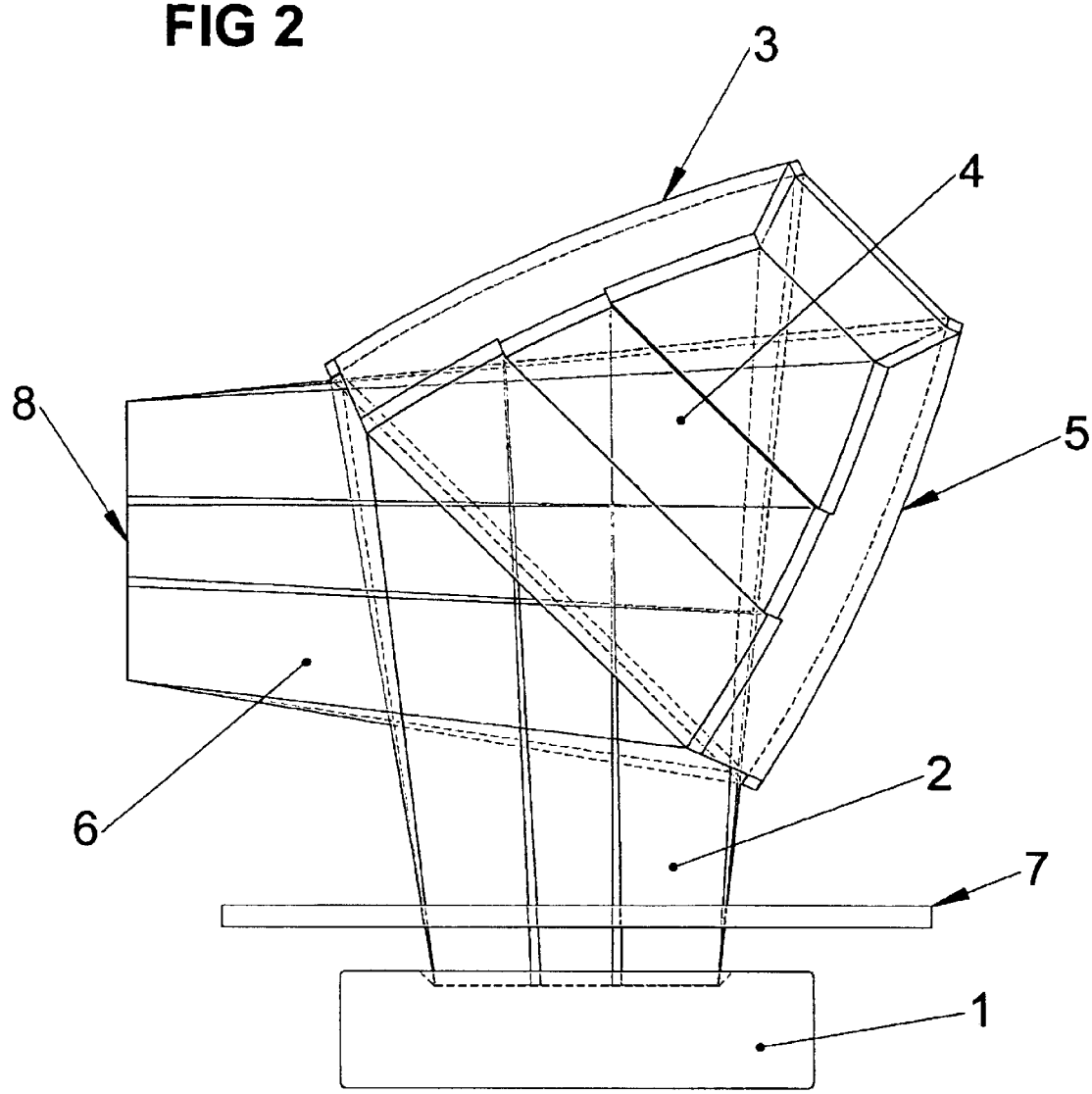
FIG. 2 shows a real imaging system that includes at least one aspheric curved reflector and a circular polarizer positioned in front of the image source to reduce ghosting.

FIG. 2 shows the same system as that of FIG. 1, with the circular polarizer (7) placed in front of the monitor face (1). This prevents a ghost image from being formed and reflected off the screen surface of the monitor (1). LCD monitors typically require a contrast enhancement film to enhance the black levels. By substituting a circular polarizer (7) in front of the LCD monitor (1), the contrast levels are significantly improved and ghost imaging is significantly reduced.

Figure 3:
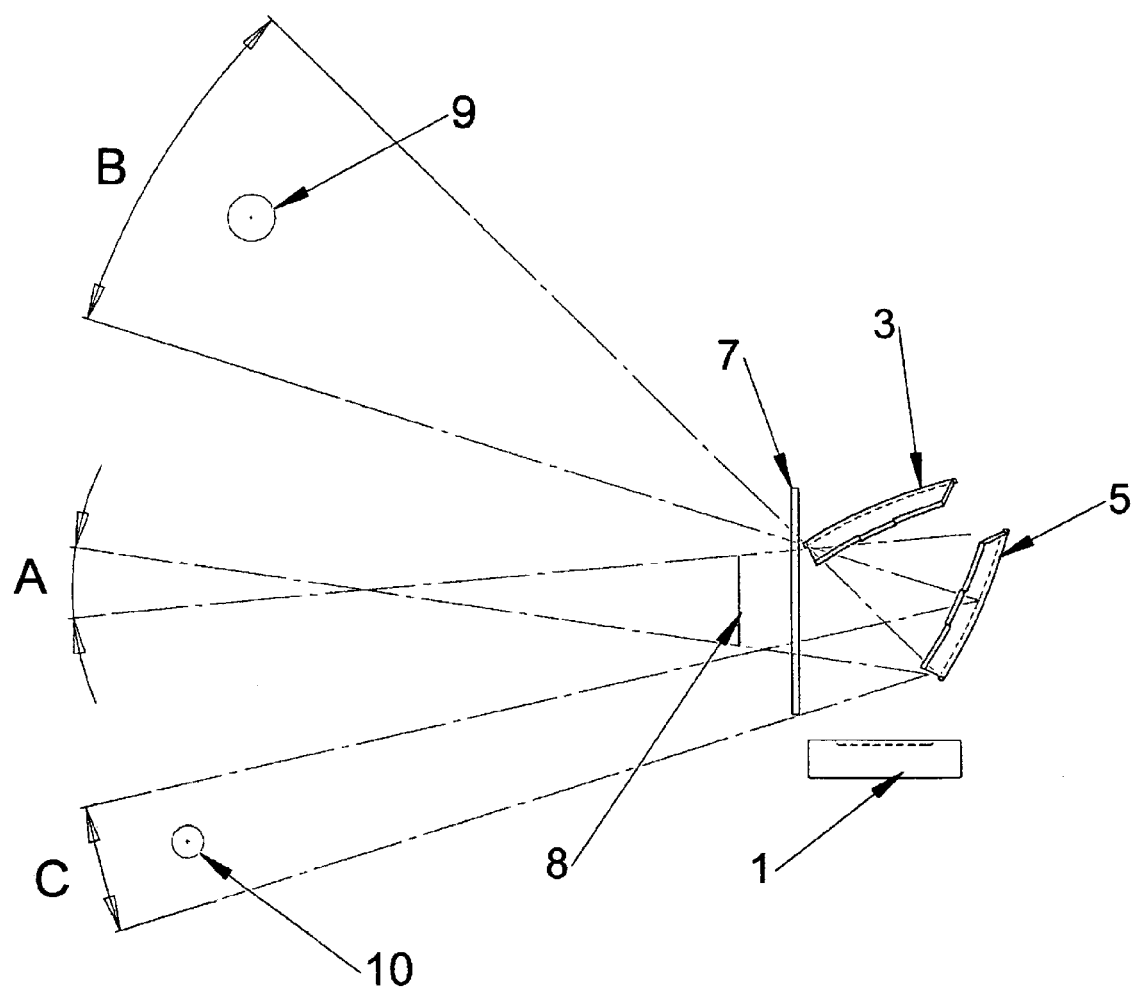
FIG. 3 shows the view area of ghost imaging in a real imaging system that includes at least one aspheric curved reflector.

Referring to FIG. 3, ghost imaging of the real image optical system described in FIG. 1 is described. An external light source (9) enters the system through the view aperture window (7) and strikes the lower curved reflector (5). It is then reflected in a diverging beam, passing through the window (7) to form a ghost image (10) within the viewing area (C) shown. In a dual aspheric real image system, the ghost images are not visible within the normal viewing area (A), but in an environment where people are sitting or viewing from a lower angle, a real ghost image is formed and is visible.

Figure 4:
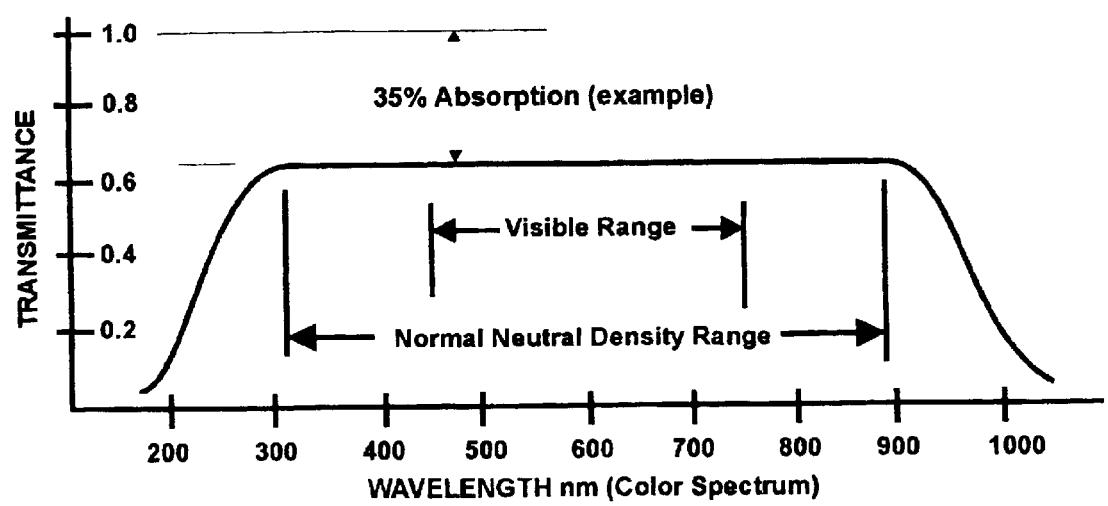
FIG. 4 shows a sample spectrograph of a typical neutral density window used in a real image system to reduce ghost imaging.

FIG. 4 shows a typical spectrograph of the image color spectrum of light passing through a neutral density filter window. The neutral density window reduces the ghost imaging, while enhancing the contrast of a real image. The neutral density window optionally is used in a tilted imaging system, for example, as described in copending application Ser. No. 10/126,167, filed Apr. 19, 2002, entitled "METHOD OF GHOST REDUCTION AND TRANSMISSION ENHANCEMENT FOR A REAL IMAGE PROJECTION SYSTEM", the complete disclosure of which is hereby incorporated herein by reference. A neutral density filter absorbs an equal percentage of light for all colors across the visible spectrum, thus maintaining the color integrity of the real image.

Figure 5:
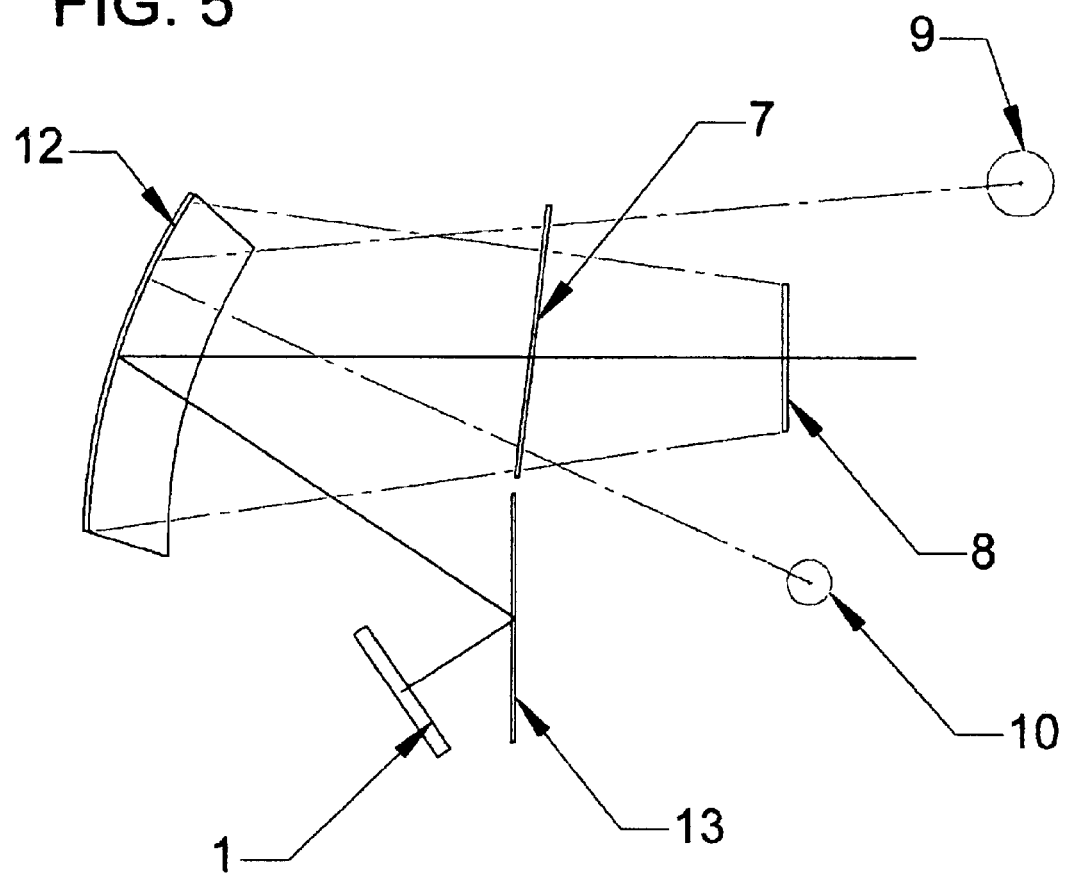
FIG. 5 shows a circular polarizer or neutral density window as used in an off-axis tilted optic real image system.

FIG. 5 shows a tilted real imaging system, such as that described in copending application Ser. No. 10/126,167, filed Apr. 19, 2002, entitled "METHOD OF GHOST REDUCTION AND TRANSMISSION ENHANCEMENT FOR A REAL IMAGE PROJECTION SYSTEM". Light from the image source (1) strikes a reflective flat mirror (13) and is reflected to a curved reflector (12) whose optical axis is tilted approximately 15 degrees off-axis to the viewing axis. The light reflects off of the curved reflector (12) in a diverging beam, passing through the circular polarizer (7), forming a real image (8) in viewer space. The circular polarizer in the example is right circular, consisting of a linear polarizing film, and a quarter wave plate. The linear polarizing film is facing the real image (8). Light from outside the system (9) enters the system passing through the circular polarizer (7), first passing through the linear polarizer becoming vertically polarized, then passing through the quarter wave plate becoming right circular (e.g.), the right circular polarized light strikes the curved reflector (12), reversing the polarization to left circular. The reflected converging beam of light then strikes the circular polarizing window (7), passing first through the quarter wave where the left circular polarized light rotates to horizontally polarized light. The vertical linear polarizing film of the circular polarizer (7) blocks the horizontally polarized light, and therefore no ghost image is visible in the system.

An alternative embodiment uses a neutral density filter window, as described in FIG. 4, which significantly increases image contrast and significantly reduces ghost imaging.

Figure 6:
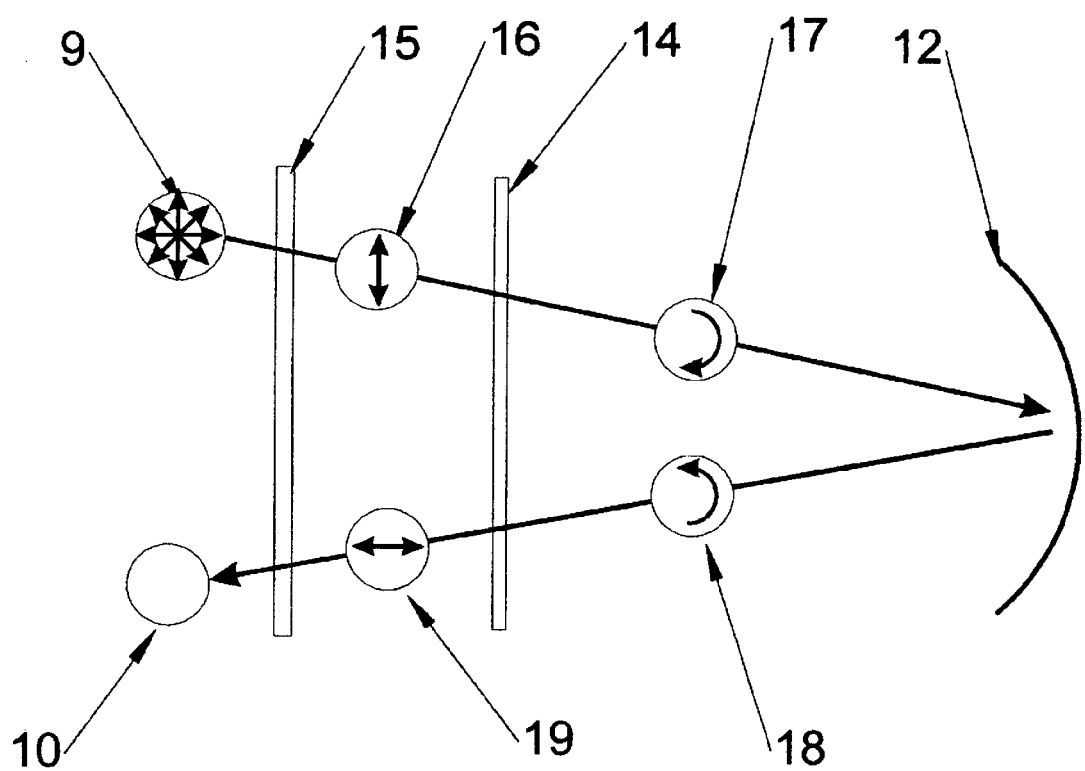
FIG. 6 shows how a circular polarizer reduces ghost imaging.

FIG. 6 shows the polarization characteristics of a circular polarizer. In the example, unpolarized light (9) from outside the system passes through the linear polarizing element (15) of the circular polarizing window, and becomes vertically polarized (16). The vertically polarized light (16) then passes through the quarter wave plate element (14) of the circular polarizer, becoming right circularly polarized (17). The direction of circularity reverses when reflecting off of a mirror surface, so the right circularly polarized light (17) reflects off of the curved reflector (12), changing to left polarized light (18). As the left circularly polarized light (18) passes through the quarter wave element (14), it becomes horizontally polarized (19). The horizontally polarized light (19) is blocked completely by the vertical linear polarizing element (15). Because there is no beamsplitter in the system, the circular polarization is not corrupted into elliptical polarization, so unlike traditional imaging systems of the prior art, the circular polarizing filter may be positioned at the system view aperture, rather than between a beamsplitter and curved mirror (12).

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A real image display system comprising:
   a) a real imaging system for projecting a real image, said imaging system incorporating curved reflectors, at least one of which comprises an aspheric surface of revolution; and
   b) a circular polarizing window or a neutral density filter window; and
   c) wherein said real image display system projects a real image that appears to a viewer thereof as an image floating in space.

2. The real image display system of claim 1, wherein said neutral density filter window is between 15% and 40% absorption.

3. The real image display system of claim 2, wherein said neutral density filter has an anti-reflective coating on one or both surfaces thereof.

4. The real image display system of claim 1, wherein said circular polarizing window comprises a linear polarizing film and quarter wave plate, said linear polarizing film facing said real image, and said quarter wave plate facing at least one of said curved reflectors.

5. The real image display system of claim 4, wherein said circular polarizing window is secured to a clear substrate or between two clear substrates.

6. The real image display system of claim 4, wherein said circular polarizing window includes an anti-reflective coating on one or both surfaces thereof.

7. The real image display system of claim 4, wherein said real imaging system does not utilize a tilted beamsplitter between said curved reflector and said real image, such that said real image is not reflected from a beamsplitter surface.

8. A real image projection system, comprising:
   a) a visual staging station defining a space for viewing images from a vantage point along a viewing axis;
   b) at least two curved optics of the conical family of curves, at least one of said optics comprising an aspherical surface of revolution, wherein said curved optics are arranged such that an object positioned substantially at or near a focal point of one of said curved optics forms a real image positioned substantially at or near a focal point of another of said curved optics, and said real image is projected along said viewing axis and appears as a floating image when viewed from said visual staging station; and c) a circular polarizing window or a neutral density filter window.

9. The real image display system of claim 8, wherein said neutral density filter window is between 15% and 40% absorption.

10. The real image display system of claim 9, wherein said neutral density filter has an anti-reflective coating on one or both surfaces thereof.

11. The real image display system of claim 8, wherein said circular polarizing window comprises a linear polarizing film and quarter wave plate, said linear polarizing film facing said real image, and said quarter wave plate facing at least one of said curved reflectors.

12. The real image display system of claim 11, wherein said circular polarizing window is secured to a clear substrate or between two clear substrates.

13. The real image display system of claim 9, wherein said circular polarizing window includes an anti-reflective coating on one or both surfaces thereof.

14. The real image display system of claim 9, wherein said real imaging system does not utilize a tilted beamsplitter between said curved reflector and said real image, such that said real image is not reflected from a beamsplitter surface.

15. A real image projection system, comprising:

a) a plurality of curved reflectors for projecting a real image, at least one of said reflector comprising an aspherical surface of revolution and being positioned in a tilted configuration, wherein an optical axis of said reflector is not coincident with a viewing axis, and a beampath between a target source and said curved reflector neither passes through nor reflects off of a beamsplitter; and b) a circular polarizing window or a neutral density filter window; and c) wherein said real image projection system projects a real image that appears to a viewer thereof as an image floating in space.

16. The real image display system of claim 15, wherein said neutral density filter window is between 15% and 40% absorption.

17. The real image display system of claim 16, wherein said neutral density filter has an anti-reflective coating on one or both surfaces thereof.

18. The real image display system of claim 15, wherein said circular polarizing window comprises a linear polarizing film and quarter wave plate, said linear polarizing film facing said real image, and said quarter wave plate facing at least one of said curved reflectors.

19. The real image display system of claim 18, wherein said circular polarizing window is secured to a clear substrate or between two clear substrates.

20. The real image display system of claim 19, wherein said circular polarizing window includes an anti-reflective coating on one or both surfaces thereof.

* * * * *